United States Patent [19]

Lamartino

[11] Patent Number: 4,837,897
[45] Date of Patent: Jun. 13, 1989

[54] APPARATUS FOR MONITORING THE WIDTH OF A STUFFED FOOD CASING

[75] Inventor: Salvatore P. Lamartino, Orland Park, Ill.

[73] Assignee: Viskase Corporation, Chicago, Ill.

[21] Appl. No.: 182,531

[22] Filed: Apr. 18, 1988

[51] Int. Cl.$^4$ .............................................. A22C 7/00
[52] U.S. Cl. .......................................... 17/35; 17/49
[58] Field of Search .................... 17/33, 35, 49, 41, 42

[56] References Cited

U.S. PATENT DOCUMENTS

| | | |
|---|---|---|
| Re. 30,390 | 9/1980 | Kupcikevicius et al. |
| 2,999,270 | 9/1958 | Knapp . |
| 3,148,408 | 5/1962 | Good . |
| 3,396,426 | 11/1965 | Ziolko . |
| 3,553,768 | 1/1968 | Wilmsen . |
| 4,077,090 | 3/1978 | Frey et al. |
| 4,558,488 | 12/1985 | Martinek . |
| 4,625,362 | 12/1986 | Kollross et al. |

OTHER PUBLICATIONS

T-Sizer dated Mar. 3, 1986 and Oct. 1, 1986.

*Primary Examiner*—Willie G. Abercrombie
*Attorney, Agent, or Firm*—Roger Aceto

[57] ABSTRACT

Shoes for tracking against the opposite sides of a stuffed casing are carried by two independent parallel motion linkages suspended from two shared shafts. Each linkage is journaled to one shaft and fixed to the other so each link drives only one shaft. Each shaft in turn drives a signal generator so that an electrical signal is generated in response to the movement of the shoes in a plane transverse the longitudinal axis of the stuffed casing as represented by the rotation of the shafts.

11 Claims, 3 Drawing Sheets

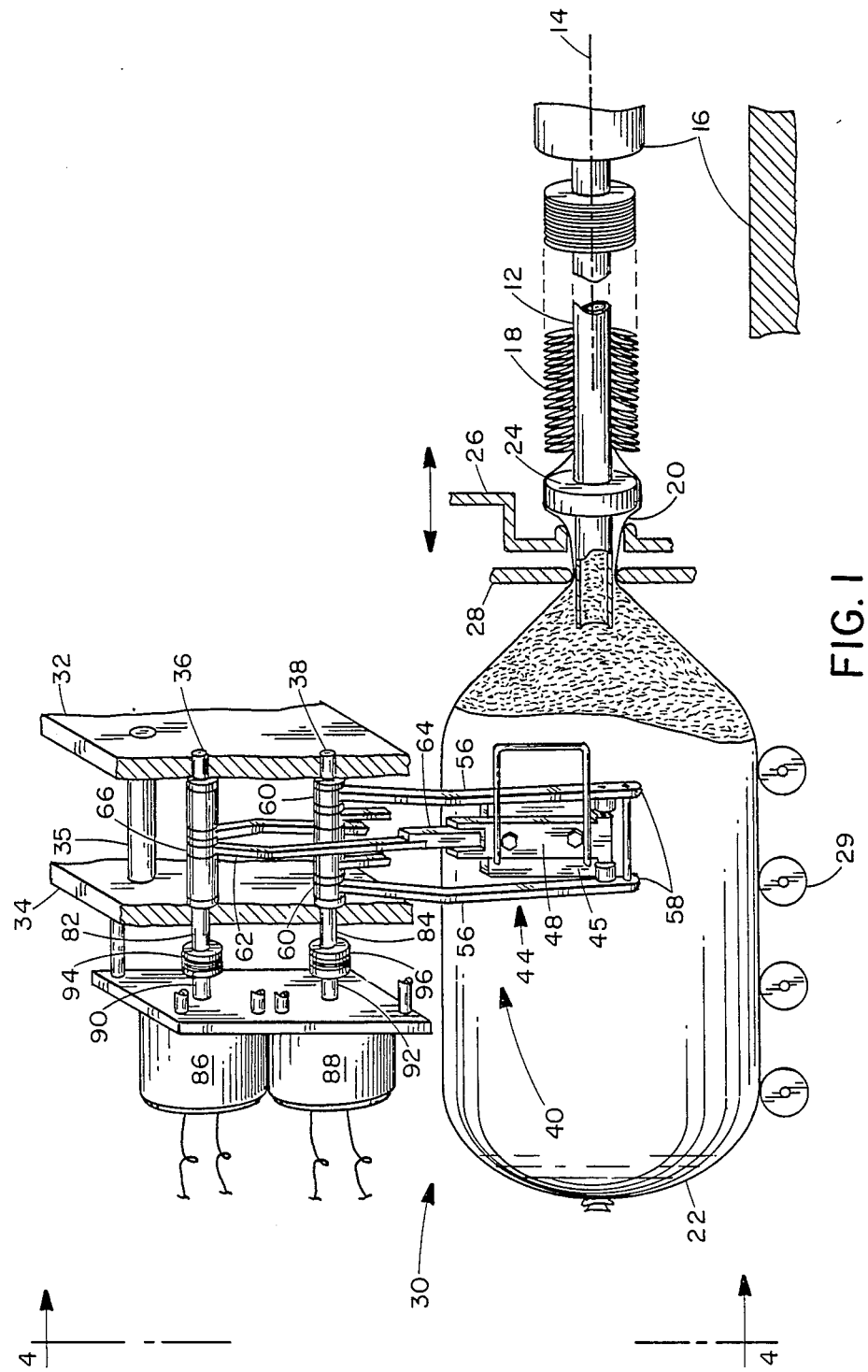
FIG. I

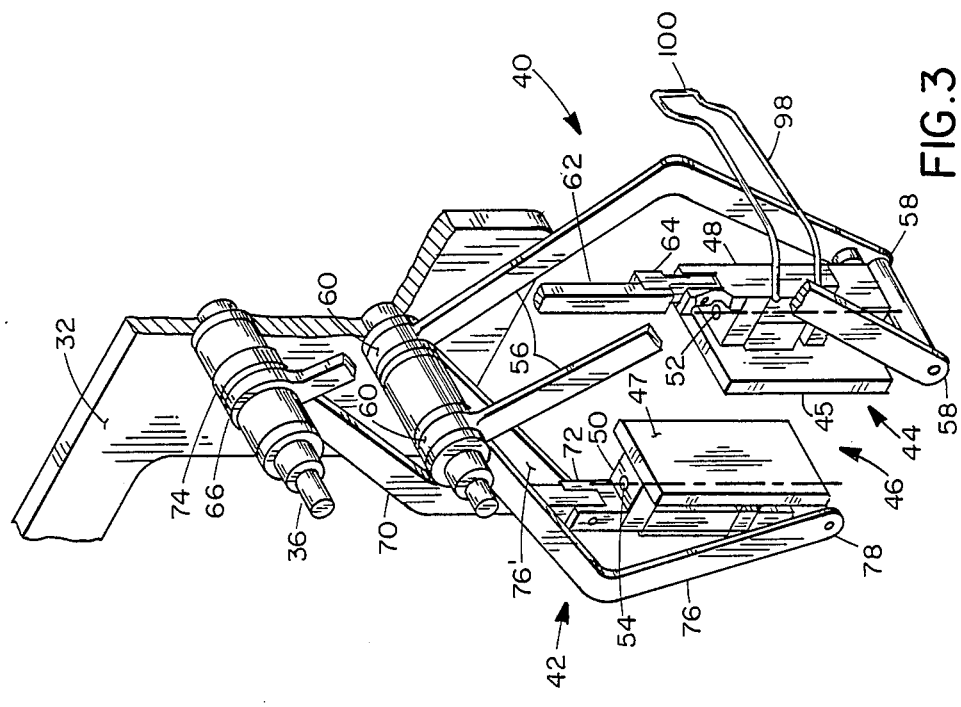
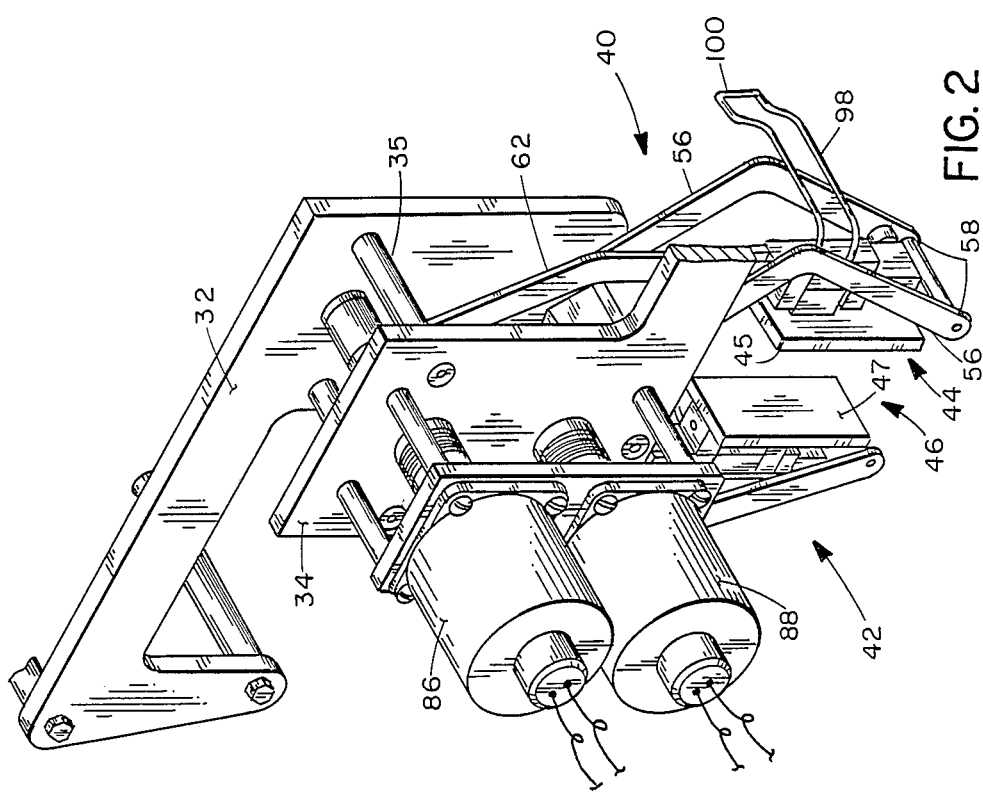

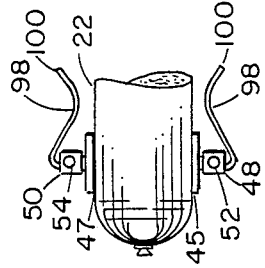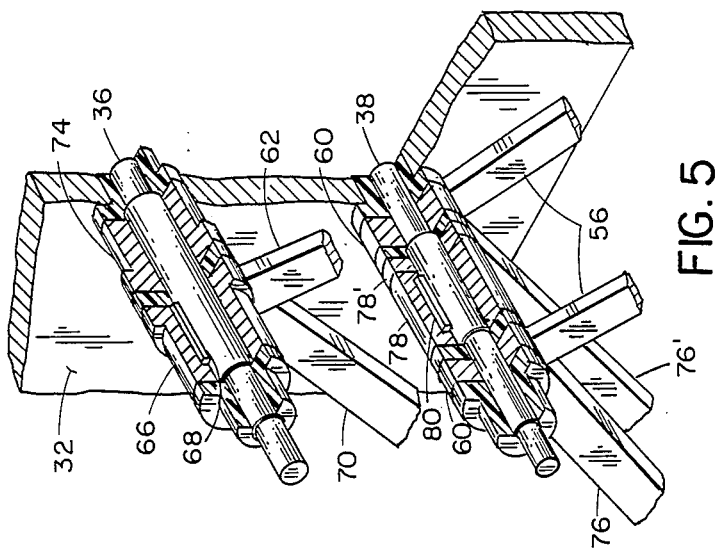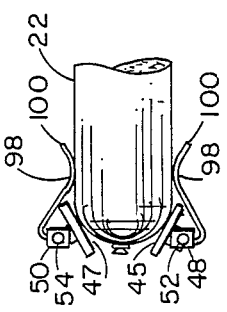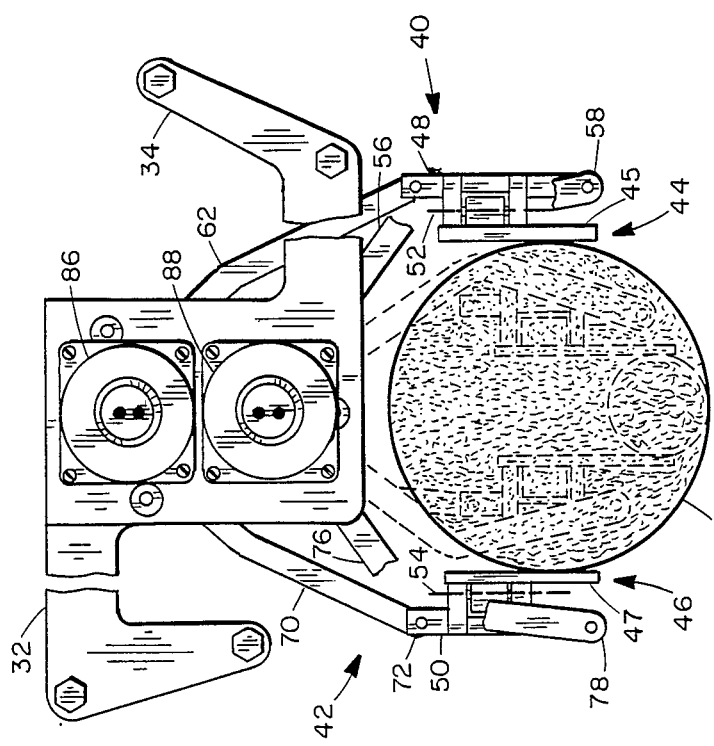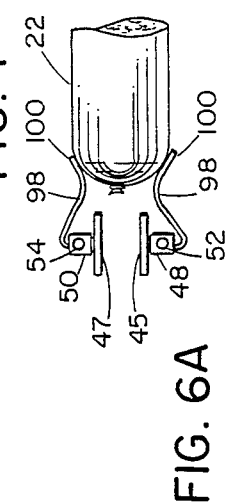

APPARATUS FOR MONITORING THE WIDTH OF A STUFFED FOOD CASING

TECHNICAL FIELD

The present invention relates to apparatus for sensing and controlling the filled diameter of casing during stuffing and, in particular, to means for suspending sensors which permit the sensors to ride against the filled casing and to move responsive to changes in the filled diameter.

BACKGROUND OF THE INVENTION

For aesthetic, economic and quality control considerations it is desirable, for certain food products, to stuff the casing to a substantially uniform filled diameter over its entire length. For example, a substantially uniform filled diameter is especially desired for the production of stuffed products which are subsequently sliced and prepackaged for retail sales such as bologna or the like. Machines which slice these products usually are set up to cut a predetermined number of slices for each package, but at retail the packages are sold on a weight basis. Accordingly, it is important for the producer to stuff products of substantially uniform filled diameter so that the predetermined slice count will consistently produce packages of substantially the same weight.

Automatic stuffing machines use casing in the form of a shirred stick so that a plurality of stuffed products or "logs" can be made from a single stick. For example, a shirred stick two feet long may contain upwards of two hundred feet or more of casing. After the stick is loaded onto the machine, the intention is to run the machine continuously until the supply of casing is exhausted. Accordingly, it is important that the stuffed diameter of the logs made during the run remains substantially constant.

Stuffed diameter is determined by several factors such as the extensibility of the casing, its moisture content, the drag on the casing during filling and the stuffing pressure. In Reissue U.S. Pat. No. Re. 30,390, a stuffing machine is disclosed which includes means for continuously stuffing shirred casing to produce logs of substantially constant stuffed diameter. In this system, a sizing disc implanted in the casing serves to circumferentially stretch the casing just prior to stuffing. This circumferential stretch exerts a drag or "holdback" on the casing to insure that the casing stuffs out to the full diameter recommended by the casing manufacturer.

U.S. Pat. No. 4,077,090 discloses an improvement to the system of Re. 30,390 by providing means to adjust the drag at the onset of stuffing. In the '090 Patent, a pressure ring is positioned adjacent the sizing disc which directs the casing through a tortuous path first over the sizing disc and then inward through the pressure ring. By adjusting and then fixing the longitudinal distance between the pressure ring and the sizing disc, the drag on the casing is adjusted. However, once made, the adjustment is fixed and is not altered unless stuffing is stopped. Also, the system must be manually set. This done by manually measuring the circumference of the first several stuffed pieces or "logs". The operator then makes a manual adjustment to increase or decrease holdback as needed to provide the correct stuffed diameter.

Periodically during stuffing, the operator will measure the circumference of a log and will stop the machine to make any adjustment needed to correct for deviations from the desired circumference. Accordingly, while the machine is designed for continuous stuffing, the start-up procedure and any subsequent stuffed diameter correction require stopping the machine. This detracts from the economic benefits of continuous operation. Stopping the machine also allows sections of deshirred casing to lose moisture during the interval that the machine is stopped and these sections may have different stuffing properties than casing sections of higher moisture.

Various systems are known for automatically adjusting the drag on the casing during the stuffing cycle to reduce the need for stopping the stuffing operation.

In these systems, means are provided for monitoring the stuffed product in order to obtain feed back information which is then applied to means for adjusting the drag on the casing. For example, in U.S. Pat. No. 4,558,488 the stuffed log passes through the annulus of a calibrating ring. The proximity of the log surface to the inner surface of the ring creates a pneumatic back pressure which is sensed as an indication of the diametrical size of the log. In U.S. Pat. No. 3,148,408 the log moves passed a shoe pivoted towards the log surface. Movement of this shoe is used as an indication of the stuffed diameter.

In a copending application Serial No. 07/039197 now U.S. Pat. No. 4,766,645, the diameter or width of the stuffed log is monitored by shoes which are urged against diametrically opposite sides of a stuffed log traveling between the shoes. The shoes are independently suspended so each can move relative towards or away from a diametrically opposite shoe. The suspension system for the shoes as shown in said copending application includes a plurality of separate parallel motion linkages each associated with a single shoe. Each separate parallel motion linkage inturn is operatively associated with an encoding device. The encoding device is a signal generator which issues an electric signal representative of the movement of its associated parallel motion linkage. While this system is functional, having completely independent suspension systems cause a duplicity of components and crowds the area around the log where the suspension system is mounted. The present invention is an improved suspension system. In particular, the present invention includes an arrangement which allows separate parallel motion linkages and signal generators to share components. This eliminates duplicity of the shared components and simplifies the suspension system.

Accordingly, it is an object of the present invention to provide an improved parallel motion system for suspending shoes to monitor the stuffed diameter of casing and for linking the shoes to a signal generator.

Another object of the invention is to provide a system for measuring the width or diameter of an object by pressing independently mounted shoes against diametrically opposite sides of the object wherein the shoes are mounted on parallel motion linkages utilizing shared mounting component.

SUMMARY OF THE INVENTION

In one aspect the present invention relates to apparatus for monitoring the width of a stuffed food casing comprising:

(a) a frame extending transverse and above a longitudinal axis along which a said stuffed casing is moved during stuffing;

(b) first and second shafts journaled to said frame, said shafts being oriented substantially parallel to said longitudinal axis;

(c) first and second shoes disposed at diametrically opposite sides of said longitudinal axis for tracking against the sides of a said stuffed casing, said shoes being suspended from said shafts for swinging movement in a plane transverse said longitudinal axis;

(d) a first floating support including a connector element pivotally connected to said first shoe and journaled to said first shaft, and a drive element pivotally connected to said first shoe and fixed to said second shaft such that movement of said first shoe in said transverse plane rotatably drives said second shaft;

(e) a second floating support including a connector element pivotally connected to said second shoe and journaled to said second shaft and a drive element pivotally connected to said second shoe and fixed to said first shaft such that movement of said second shoe in said transverse plane rotatably drives said first shaft; and (f) means driven by said shafts for issuing a signal responsive to the distance moved by each of said shoes as represented by the rotation of said shafts.

DESCRIPTION OF THE DRAWINGS

FIG. 1 is a schematic representation of a stuffing machine employing the width monitoring means of the present invention;

FIG. 2 is a perspective view of the present invention;

FIG. 3 is a view similar to FIG. 2 with portions removed to show components of the invention with more clarity;

FIG. 4 is a view generally along lines 4—4 of FIG. 1;

FIG. 5 is a view showing a portion of FIG. 3 on an enlarged scale partly broken away and in section; and FIGS. 6a–6c illustrate the opening of the width monitoring means to accommodate the passage of the object being measured.

DETAILED DESCRIPTION OF THE INVENTION

Referring to the drawings, FIG. 1 shows a stuffing horn 12 which defines a longitudinal stuffing axis 14. The stuffing machine, a portion of which is shown at 16, is conventional so that only portions of the machine required for purposes of understanding the present invention will be described in detail. It is sufficient to say that in use, a shirred casing 18 is positioned about the stuffing horn. During stuffing the food product which exits the stuffing horn enters and draws forward casing 20 from the shirred supply to make the stuffed product or "log" 22.

It is known in the art that the drag or "holdback" which restrains the free forward movement of the casing during stuffing is a factor in controlling the product diameter. For example, if all other factors are equal an increase in the holdback will increase the product diameter and conversely a decrease in the holdback will decrease the product diameter. Various means are known for adjusting and controlling holdback on the casing. These include use of an internal sizing disc as described in the aforesaid Reissue Patent 30,390 and U.S. Pat. No. 4,077,090. An arrangement for gripping the external surface of the casing to control drag or holdback is disclosed in U.S. Pat. No. 4,709,450. Accordingly, either an internal or an external casing contacting member for controlling holdback, can utilize in association with the present invention for controlling the filled diameter of casing during stuffing.

For purposes of illustration, FIG. 1 shows a sizing disc 24 mounted to the stuffing horn. Casing 20 which deshirrs from the stick 18 passes over the disc and then is directed through a pressure ring 26. Adjustment to the casing holdback is made by changing the spacing between the disc and pressure ring. This can be accomplished, for example, by moving the disc 24 relative to a stationary pressure ring 26 or by moving the pressure ring 26 longitudinally toward or away from the sizing disc. A conventional annular seal ring 28 is moveable to a position about the discharge end of the stuffing horn and, as shown, serves to prevent food product from back flowing along the horn. Also conventional is a conveyor 29 for supporting the stuffed log 22 and conveying it away from the stuffing horn. Not shown is a conventional clipper carriage for gathering, closing and severing the casing after the log has reached a desired length.

The size monitoring system of the present invention generally indicated at 30 is arranged to monitor the diameter of log 22. In this respect, the system includes a frame composed of two parallel plates 32, 34 and one or more cross braces 35. These plates are spaced forward of the stuffing horn 12 and transverse the stuffing axis 14. The plates also are disposed above the stuffing axis so as not to interfere with the passage of a log 22 beneath the frame. Extending between and journaled to each of the plates 32, 34 is an upper shaft 36 and a lower shaft 38. The shafts 36, 38 are parallel one to another and preferably are arranged directly above and parallel to the longitudinal axis 14.

Suspended from each shaft 36, 38 and extending down at diametrically opposite sides of log 22 is a floating support structure generally indicated at 40, 42 (FIGS. 2-4). The floating support structures 40, 42 support a pair of members indicated at 44, 46 for contacting against diametrically opposite sides of the stuffed log 22. The contacting members 44, 46 track against the stuffed log and can be any suitable means such as a shoe as shown which rubs against the log or a roller or other rotating member which is turned by the passage of the log. For purposes of this description the contacting members 44, 46 will be referred to hereafter as "shoes".

As shown in the FIGS. 3 and 4, shoes 44, 46 each include a flat plate 45, 47 having a generally vertical plane surface for contacting against the sides of log 22. Each plate 45, 47 is hinged to an associated block 48, 50 respectively so that the plates can pivot about a vertical axis 52, 54. This pivoting allows the shoes to seek and accommodate the surface of a passing stuffed log 22. Each block 50, 52 is in turn attached to one of the floating supports 40, 42 as set out hereinbelow.

Both floating supports 40, 42 include a parallel motion linkage. In this respect, floating support 40 includes a pair of upright connector arms 56 (FIGS. 1-4) as a first element of the parallel motion linkage. These arms are each pivotally connected at a lower end 58 to a lower portion of block 48. At their upper end 60 the arms are journaled to shaft 38 (FIGS. 1, 3 and 5). Accordingly, arms 56 are free to swing with respect to shaft 38 wherein shaft 38 constitutes the axis about which the arms 56 rotate.

A second element of the parallel motion linkage of floating support 40 is a single drive arm 62 (FIG. 3). This single arm is pivoted at a lower end 64 to an upper portion of the block 48. As best seen in FIG. 5, the upper end 66 of drive arm 62 is fixed to the upper shaft 36 by a key 68 so that movement of the arm will rotatably drive shaft 36.

It should be appreciated that the vertical distance between shafts 36 and 38 is equal to the vertical distance between the pivot connections of ends 58, 64 to block 48 so that the single drive arm 62 and the pair of connector arms 56 comprise elements of parallel motion linkage for suspending shoe 44. With this arrangement shoe 44 will remain substantially vertically oriented as shown in the figures as it moves in a plane transverse the stuffing axis.

The diametrically opposed shoe 46 is suspended on its floating support 42 in a similar fashion. In this respect, FIGS. 3 and 4 show that support 42 includes a single, generally upright connector arm 70. This arm is pivotally connected at its lower end 72 to an upper portion of block 50. The upper end 74 of the arm is journaled to shaft 36. Thus, the single connector arm 70 is free to rotate with respect to shaft 36 whereas its counterpart, arm 62, is keyed to and drives shaft 36.

The second element of the parallel motion linkage comprising floating support 42 includes the pair of generally upright arms 76, 76'. Both arms are pivotally connected at their lower ends 78 to a lower portion of block 50. As best seen in FIG. 5, one arm 76' is journaled at its upper end 78' to lower shaft 38. The other arm 76 of the pair is a drive arm in that it is fixed at its upper end 78 by a key 80 to shaft 38. Accordingly, movement of this arm pair 76, 76' serves to rotatably drive shaft 38 whereas the counterpart arm pair 56 is free to rotate with respect to shaft 38.

Referring now to FIG. 1, each shaft 36, 38 has an end 82, 84 which extends through plate 34. Associated with each shaft 36, 38 is a digital encoder 86, 88 respectively. Each encoder is fixed to plate 34 and has a shaft 90, 92 coupled by a connector 94, 96 to the associated shafts 36, 38 respectively. With this arrangement each of the shafts 36, 38 drives the associated encoder shaft 90, 92. Rotation of the encoder shafts 90, 92 is translated to a stream of electrical pulses by the encoders wherein the number of pulses represent the arc length through which the encoder shaft has rotated.

As thus described, it should be appreciated that movement of shoe 44 in a plane transverse the stuffing axis 14 causes shaft 36 to rotate which in turn drives encoder 86. Movement of shoe 46 in a direction transverse the stuffing axis 14 causes shaft 38 to rotate in turn drives encoder 88. Accordingly, movement of the shoes 44, 46 representing changes in the stuffed diameter of the log 22 between the shoes is translated by the encoders 86, 88 to a stream of electrical pulses. The stream of pulses from each encoder is then fed to a microcomputor (not shown) which analyzes the data from the encoders and issues a control signal as appropriate to adjust the means for exerting the holdback of the casing as is necessary to correct for any changes in the diameter of the stuffed log. In the arrangement as illustrated in FIG. 1, adjustment holdback is accomplished by moving the pressure ring 26 towards or away from sizing disc 24.

It should be appreciated that the pivot points as represented by shaft 36, 38 are shared by both of the floating supports 40, 42. The shared nature of these components notwithstanding, each shaft is separately driven by only one of the floating supports and its associated shoe. Accordingly, a shaft which is rotatably driven by one of the supports only serves as a bearing and is not driven by the other of the supports. This simplifies construction in that it eliminates the need for a duplicate set of shafts 36, 38 one set associated with each of the parallel motion linkages comprising floating supports 40, 42. Also, by having shafts 36, 38 common to both supports 40, 42 there are only two shafts which are made parallel to the stuffing axis 14 rather than four.

In the arrangement shown in the figures the shoes are held against the diametrically opposite sides of the log by gravity. No mechanism is provided for moving the shoes apart in order to permit the entry of a log between the shoes or the discharge of the log in a sideways direction from conveyor 29. Discharge in a sideways direction normal to the longitudinal axis 14 can be delayed until the trailing end of the log has cleared the size control system 30. However, an earlier discharge is accomplished by having the arms 56 spaced apart sufficiently to permit the block 48 and plate 45 to pass between the arms. With this arrangement, the sideways discharge of a stuffed log 22 towards floating support 40 is able to push the support out of the way as the log is discharged.

When there is no log between the shoes the shoes tend to fall towards the longitudinal axis 14. Accordingly, means are provided to move the shoes apart upon the approach of the leading end of the stuffed log so that the leading end will not hit the shoes head on. In this respect, FIG. 6 shows that shoe blocks 48, 50 are provided with a spring wire feeler 98 which extends outward from the shoe in the direction towards the stuffing horn. Each feeler terminates in a slight outward bend 100. FIGS. 6a–6c show that as a log 22 approaches the feelers the bent portion 100 will first contact the leading end of the log (FIG. 6a). As the log continues to move forward, the feelers 98 track the log which forces the shoe blocks 48, 50 apart (FIG. 6b). Since the plates 45, 47 are hinged to their respective blocks 48, 50 the plates on contact with the log leading end will be tilted about the vertical axes 52, 54 to form a slight funnel shape for receiving the leading end of the log. Thereafter, when the log has been received between the plates 45, 47 (FIG. 6c) the feelers 98 are out of contact with the log so that the plates pivot and contact directly against the sides of the log.

Having thus described the invention in detail, what is claimed as new is:

1. Apparatus for monitoring the width of a stuffed food casing comprising:
 (a) a frame extending transverse and above a longitudinal axis along which a said stuffed casing moves during stuffing;
 (b) first and second shafts journaled to said frame, said shafts being oriented substantially parallel to said longitudinal axis;
 (c) first and second shoes disposed at diametrically opposite sides of said longitudinal axis for tracking against the sides of a said stuffed casing, said shoes being suspended from said shafts for swinging movement in a plane transverse said longitudinal axis;
 (d) a first floating support including a connector element pivotally connected to said first shoe and journaled to said first shaft, and a drive element pivotally connected to said first shoe and fixed to said second shaft such that movement of said first shoe in said transverse plane rotatably drives said second shaft;

(e) a second floating support including a connector element pivotally connected to said second shoe and journaled to said second shaft and a drive element pivotally connected to said second shoe and fixed to said first shaft such that movement of said second shoe in said transverse plane rotatably drives said first shaft; and (f) means driven by said shafts for issuing a signal responsive to the distance moved by each of said shoes as represented by the rotation of said shafts.

2. Apparatus as in claim 1 wherein said connector and drive elements of each floating support constitute a parallel motion linkage for maintaining said shoes vertically oriented as said shoes move in said transverse plane.

3. Apparatus as in claim 2 wherein said shafts are disposed one above another in substantially vertical alignment with said longitudinal axis.

4. Apparatus as in claim 1 wherein said connector element of said first floating support is a spaced pair of generally upright arms, each journaled at an upper end to said first shaft and pivotally connected at a lower end to said first shoe; and said drive element is a single generally upright arm disposed between said spaced pair and having an upper end fixed to said second shaft and a lower end pivotally connected to said first shoe.

5. Apparatus as in claim 4 wherein the space between said pair of arms is larger than the width of said first shoe and said first shoe is passable between said pair of arms as said first floating support swings in said transverse plane and away from said longitudinal axis.

6. Apparatus as in claim 1 wherein said drive element of said second floating support includes a spaced pair of generally upright arms, each pivotally connected at a lower end to said second shoe, one of said upright arms being journaled at its upper end to said first shaft and the other of said arms at its upper end being fixed to said first shaft; and said connector element is a single generally upright arm disposed between said spaced pair and having an upper end journaled to said second shaft and a lower end pivotally connected to said second shoe.

7. Apparatus as in claim 1 wherein each of said shoes comprises:

(a) a block connected to each of said first and second elements; and (b) a plate hinged to said block for movement about a vertical axis, said plate having a generally vertical plane surface for contacting against the side of a side stuffed casing.

8. Apparatus as in claim 1 wherein said shoes fall by gravity inward towards said longitudinal axis and means on each shoe engageable with a leading end of a said stuffed casing for moving said shoes apart to permit the entry of a said stuffed casing between said shoes.

9. Apparatus as in claim 1 wherein (a) said shafts are disposed one above the other in substantially vertical alignment with said longitudinal axis;

(b) said first support having its connector element journaled to the lower of said shafts and its drive element fixed to the upper of said shafts; and (c) said second support having its connector element journaled to the upper of said shafts and its drive element fixed to the lower of said shafts.

10. Apparatus as in claim 9 wherein said connector and drive elements of each support constitute a parallel motion linkage.

11. Apparatus for monitoring the widths of a stuffed casing comprising:

(a) a frame disposed transverse and above a longitudinal axis along which a said casing is moved during stuffing;

(b) first and second shafts journaled to said frame, said shafts being arranged one above another and oriented substantially parallel to said longitudinal axis;

(c) a first parallel motion linkage having a drive arm fixed to said first shaft and a connector arm journaled to said second shaft;

(d) a second parallel motion linkage having a drive arm fixed to said second shaft and a connector arm journaled to said first shaft;

(e) a shoe supported by each of said parallel motion linkages for movement in a plane transverse said longitudinal axis and against diametrically opposite sides of a said stuffed casing; and (f) means operatively connected to each of said shafts for issuing a signal responsive to the distance moved by said shoes as represented by the rotation of said shafts.

* * * * *

UNITED STATES PATENT AND TRADEMARK OFFICE
CERTIFICATE OF CORRECTION

PATENT NO. : 4,837,897

DATED : June 13, 1989

INVENTOR(S) : Salvatore P. Lamartino

It is certified that error appears in the above-identified patent and that said Letters Patent is hereby corrected as shown below:

In col. 5, line 49, change "rotate in turn" to -- rotate which in turn--.

In col. 8, line 4, change "side" to --said--.

Signed and Sealed this

Seventh Day of May, 1991

Attest:

HARRY F. MANBECK, JR.

Attesting Officer

Commissioner of Patents and Trademarks